(12) United States Patent
Cahill et al.

(10) Patent No.: US 9,533,667 B2
(45) Date of Patent: Jan. 3, 2017

(54) SYSTEM AND METHOD OF DETERMINING ACCUMULATOR STATUS

(71) Applicant: GOODRICH CORPORATION, Charlotte, NC (US)

(72) Inventors: Eric D. Cahill, Troy, OH (US); Paul R. Burte, Clayton, OH (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 14/527,930

(22) Filed: Oct. 30, 2014

(65) Prior Publication Data

US 2015/0217747 A1 Aug. 6, 2015

Related U.S. Application Data

(60) Provisional application No. 61/936,418, filed on Feb. 6, 2014.

(51) Int. Cl.
*G06F 19/00* (2011.01)
*B60T 17/22* (2006.01)
(Continued)

(52) U.S. Cl.
CPC .............. *B60T 17/221* (2013.01); *B60T 13/14* (2013.01); *F15B 1/24* (2013.01); *F15B 19/005* (2013.01);
(Continued)

(58) Field of Classification Search
CPC ........ B60T 13/14; B60T 17/22; B60T 17/221; F15B 19/005; F15B 1/24; F15B 2201/205; F15B 2201/31; F15B 2201/505; F15B 2201/51
(Continued)

(56) References Cited

U.S. PATENT DOCUMENTS

| 5,074,145 A * | 12/1991 | Hattori | ...................... B60T 8/90 340/453 |
| 2002/0035832 A1* | 3/2002 | Nakamura | ............ B60T 8/4081 60/413 |
| 2010/0271125 A1* | 10/2010 | Ohba | .................... H03F 1/3247 330/149 |

FOREIGN PATENT DOCUMENTS

| FR | 2888898 | 1/2007 |
| FR | 2930605 | 10/2009 |

(Continued)

OTHER PUBLICATIONS

European Search Report for Application No. 15152368.5-1754, Dated Jun. 23, 2015.

*Primary Examiner* — Muhammad Shafi
(74) *Attorney, Agent, or Firm* — Snell & Wilmer L.L.P.

(57) ABSTRACT

A method of detecting an accumulator failure is provided. The method may comprise measuring a first pressure on a gas-side of an accumulator, measuring a second pressure on a fluid-side of the accumulator, finding a difference between the first pressure and the second pressure, and comparing the difference to a predetermined threshold. A system for detecting an accumulator failure is also provided. The system may comprise a non-transitory memory communicating with a processor, the non-transitory memory having instructions stored thereon that, in response to execution by the processor, cause the processor to perform operations. The operations may include receiving a first pressure measurement, receiving a second pressure measurement, determining a difference between the first pressure measurement and the second pressure measurement, and detecting the accumulator failure based on the difference.

13 Claims, 4 Drawing Sheets

(51) Int. Cl.
*B60T 13/14* (2006.01)
*F15B 1/24* (2006.01)
*F15B 19/00* (2006.01)

(52) U.S. Cl.
CPC ...... *F15B 2201/205* (2013.01); *F15B 2201/31* (2013.01); *F15B 2201/505* (2013.01); *F15B 2201/51* (2013.01)

(58) Field of Classification Search
USPC .......................................................... 701/70
See application file for complete search history.

(56) References Cited

FOREIGN PATENT DOCUMENTS

| | | |
|---|---|---|
| JP | H09 123893 | 5/1997 |
| JP | H09 184589 | 7/1997 |

\* cited by examiner

SYSTEM AND METHOD OF DETERMINING ACCUMULATOR STATUS

CROSS-REFERENCE TO RELATED APPLICATIONS

This application is a nonprovisional application of and claims priority to U.S. Provisional Patent Application Ser. No. 61/936,418, filed Feb. 6, 2014, entitled "Determining an Accumulator is Stuck," which is hereby incorporated by reference in its entirety.

FIELD OF INVENTION

The present disclosure relates to hydraulic systems for use in aircrafts, and, more specifically, to a system and method for determining when an accumulator is sticking.

BACKGROUND OF THE INVENTION

Aircrafts may use hydraulic systems to actuate various components in the aircraft. For example, hydraulic systems may power emergency and/or parking brake systems. In brake systems, an accumulator may serve as an energy storage device. An undetected hydraulic accumulator failure may leave pilots unprepared, as such a failure may cause the emergency brake system to not respond as expected. An accumulator may fail when the piston in the accumulator becomes stuck against the inner wall of the accumulator. The failure mode of a stuck piston may be referred to as sticktion. Sticktion may cause the hydraulic pressure in the accumulator not to rise or fall in response to the gas pressure in the accumulator rising or falling. Thus, an accumulator failing from sticktion may output less hydraulic energy than expected or desired.

SUMMARY OF THE INVENTION

A method of detecting an accumulator failure is provided comprising measuring a first pressure on a gas-side of an accumulator, measuring a second pressure on a fluid-side of the accumulator, finding a difference between the first pressure and the second pressure, and comparing the difference to a predetermined threshold.

In various embodiments, the method may further include the steps of starting a timer in response to a finding that the difference is greater than the predetermined threshold, obtaining a time elapsed from a timer, and determining whether the time elapsed is greater than a predetermined failure time. The method may also comprise the steps of measuring a third pressure on the gas-side of the accumulator, measuring a fourth pressure on the fluid-side of the accumulator, finding a second difference between the third pressure and the fourth pressure, and comparing the second difference to the predetermined threshold. The method may also comprise obtaining a second time elapsed may from the timer, and determining whether the second time elapsed is greater than the predetermined failure time.

A system for detecting an accumulator failure is also provided comprising a non-transitory memory communicating with a processor, the non-transitory memory having instructions stored thereon that, in response to execution by the processor, cause the processor to perform operations. The operations may include receiving a first pressure measurement, receiving a second pressure measurement, determining a difference between the first pressure measurement and the second pressure measurement, and detecting the accumulator failure based on the difference.

In various embodiments, the system may further comprise an accumulator and a first pressure sensor configured to measure a gas-side pressure of the accumulator. The first pressure sensor may provide the first pressure measurement. A second pressure sensor may be configured to measure a fluid-side pressure of the accumulator and provide the second pressure measurement. The operations may further include receiving a predetermined threshold, and determining the difference exceeds the predetermined threshold. The operations may comprise receiving a failure duration, and determining the difference has exceeded the predetermined threshold for the failure duration. The failure duration may be greater than or equal to 3 milliseconds. The failure duration may be less than or equal to 1 second. The predetermined threshold may be 150 psi. The accumulator failure may be a sticking piston of a piston accumulator.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

The accumulator failure detection system described herein enables detection of stuck accumulator pistons in aircraft hydraulic systems. Detecting failed accumulators enables recognition of a failed state before the failure causes a dangerous situation. Early failure detection may lead to replacement of a failing accumulator prior to either complete failure or prior to encountering a dangerous situation due to the failure. Similarly, early detection may lead to replacement of failed accumulators on less commonly used systems, such as emergency braking systems. In that regard, early detection prevents potentially dangerous use of failing systems.

Figure 1:
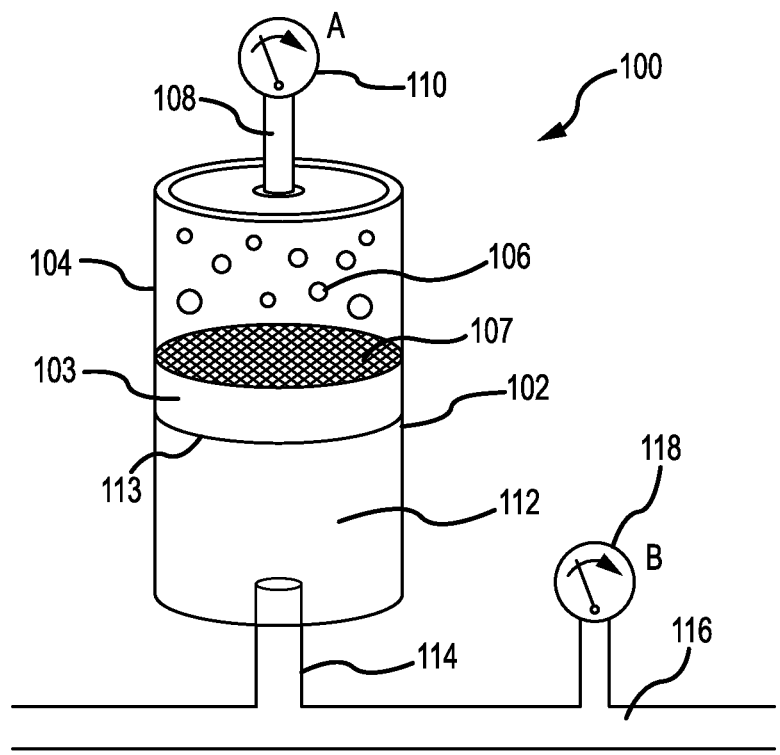
FIG. 1 illustrates a hydraulic accumulator including gas-side and fluid-side pressure sensors, in accordance with various embodiments.

In various embodiments, and with reference to FIG. 1, a hydraulic system 100 comprising an accumulator 102 with a gas-side pressure sensor 110 and a fluid-side pressure sensor 118 is shown. Accumulator 102 includes piston 103 within housing 104. Piston 103 separates accumulator 102 into a gas side 106 and a fluid side 112. Gas side 106 accepts a gas or other fluid to apply pressure to piston 103. In response to pressure applied to gas side 107 of piston 103, the piston may translate with respect to the housing 104 and apply pressure to a hydraulic fluid on the fluid side 113 of piston 103. Gas-side interface 108 may be in fluid communication with gas side 106 of accumulator 102.

In various embodiments, gas-side pressure sensor 110 may be in fluid communication with accumulator 102 and configured to measure a pressure of gas side 106 of accumulator 102. Gas-side pressure sensor 110 may take a pressure measurement at any location in fluid communication with gas side 106 of accumulator 102 that has a pressure substantially equal to gas side 106 of accumulator.

In various embodiments, fluid-side pressure sensor 118 may be in fluid communication with accumulator 102 and configured to measure a pressure of fluid side 112 of accumulator 102. Fluid-side pressure sensor 118 may take a pressure measurement at any location in fluid communication with fluid side 112 of accumulator 102 that has a pressure substantially equal to fluid side 112 of accumulator. For example, fluid-side pressure sensor 118 may be located at interface 114 of fluid side 112 or at a fluid-side point 116 in fluid communication with accumulator 102 with a pressure substantially equal to the pressure in fluid side 112 of accumulator 102.

Figure 2:
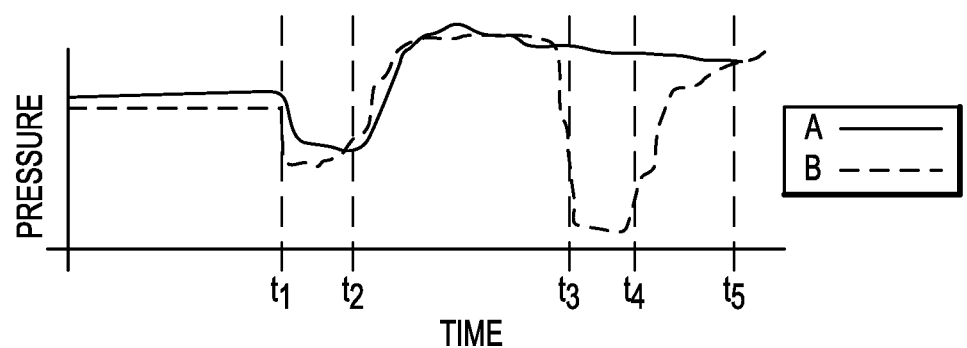
FIG. 2 illustrates pressure plotted against time as measured at a fluid-side and a gas-side pressure sensor of an accumulator, in accordance with various embodiments.

With reference to FIG. 2, a graph plotting pressure of accumulator 102 against time is shown. Plot A shows the gas-side pressure as measured by gas-side pressure sensor 110 (of FIG. 1). Plot B shows the fluid-side pressure as measured by fluid-side pressure sensor 118 (also of FIG. 1). Prior to time t1, the pressures are substantially similar, as the difference between the fluid-side pressure and gas-side pressure is within a normal threshold. At time t1, plot A and plot B both show a decrease in pressure. The pressures of plot A and plot B change at different rates from time t1 to time t2. The difference in pressure during the time period between time t1 and time t2 may remain within a normal operating threshold. The normal operating threshold may differ for different accumulators operating at different temperatures and/or altitudes. In various embodiments, a normal operational threshold may be a pressure difference less than 50 psi (345 kPa), less than 150 psi (1,034 kPa), or less than 500 psi (3,447 kPa). The normal operational pressure threshold may be selected by testing different accumulators and may vary accordingly. For example, a predetermined threshold may be 150 psi. A pressure differential greater than or equal to 150 psi may signal a stuck accumulator piston. Therefore, normal accumulator operation is determined in response to the pressure differential between pressures (measured by gas-side pressure sensor 110 and fluid-side pressure sensor 118) being within the normal operating threshold.

In various embodiments, a pressure differential (again, graphically represented by the difference between plot A and plot B) from time t3 to time t4 may signify an accumulator failure. The pressure differential may exceed a normal operational threshold from time t3 to time t4. Stated another way, the pressure differential may be above a failure threshold from time t3 to time t4. For example, the pressure differential between pressures measured at gas-side pressure sensor 110 and fluid-side pressure sensor 118 (of FIG. 1) may be 750 psi (5,171 kPa). A failure threshold may be any pressure differential greater than or equal to 500 psi. Thus, the pressure differential is in above the failure threshold, as 750 psi (5,171 kPa) is greater than 500 psi (3,447 kPa).

In various embodiments, an instantaneous pressure differential in exceeding a failure threshold may signify a slow moving piston and not a stuck piston. A persistence of the sticking may be indicative of a stuck piston. A pressure differential may remain above a failure threshold over a failure time period to signify a failure. Continuing the above example, the pressure differential remains approximately 750 psi (5,171 kPa) from time t3 to time t4. A failure duration may be, for example, any duration equal to or greater than 3 milliseconds. If the period of time between t3 and t4 is 5 milliseconds, then a failure may be detected as 5 milliseconds is greater than 3 milliseconds and the failure period has lapsed. Similarly, a failure duration may be set to any time greater than one second. If the period of time between t3 and t4 is 5 milliseconds, then a failure may not be detected since 5 milliseconds less than 1 second and the failure duration has not lapsed. The failure duration may be set to any desired time, including zero, so that a single measurement may signify a failure. The failure duration may also be dynamically adjusted based on ambient temperatures or air pressures as varying conditions may impact the response time of a piston accumulator. A return to normal pressure differentials after a period at failure pressure differentials may signify that an accumulator is failing but has not completely failed. As shown in FIG. 2, the pressure differential between plot A and plot B may return to a normal operating pressure differential at time t5.

Figure 3:
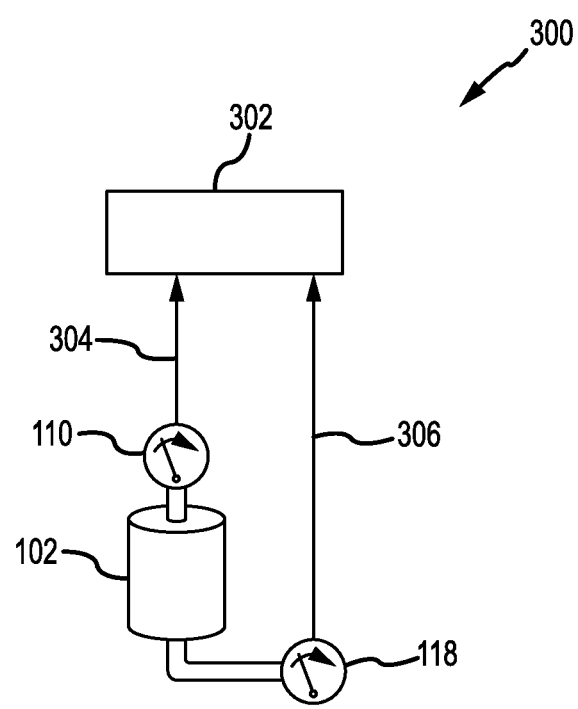
FIG. 3 illustrates a system capable of detecting a pressure differential between a fluid-side and gas-side pressure sensor, in accordance with various embodiments.

With reference to FIG. 3, a system 300 for detecting accumulator failure is shown. The system comprises accumulator 102, gas-side pressure sensor 110, and fluid-side pressure sensor 118. A brake control unit (BCU) 302 is electrically coupled to gas-side pressure sensor 110 by conduit 304. Gas-side pressure sensor 110 may take and provide a pressure measurement to BCU 302. BCU 302 is also electrically coupled to fluid-side pressure sensor 118 by conduit 306. Fluid-side pressure sensor 118 may also take and provide a pressure measurement to BCU 302. BCU may comprise a processor and a tangible, non-transitory memory to receive and compare pressure measurements from the gas-side pressure sensor and fluid-side pressure sensor. BCU may also comprise a tangible, non-transitory memory communicating with a processor, the non-transitory memory having instructions stored thereon that, in response to execution by the processor, cause the processor to perform operations. Thus, system 300 may be capable of carrying out the steps of FIG. 4.

Figure 4:
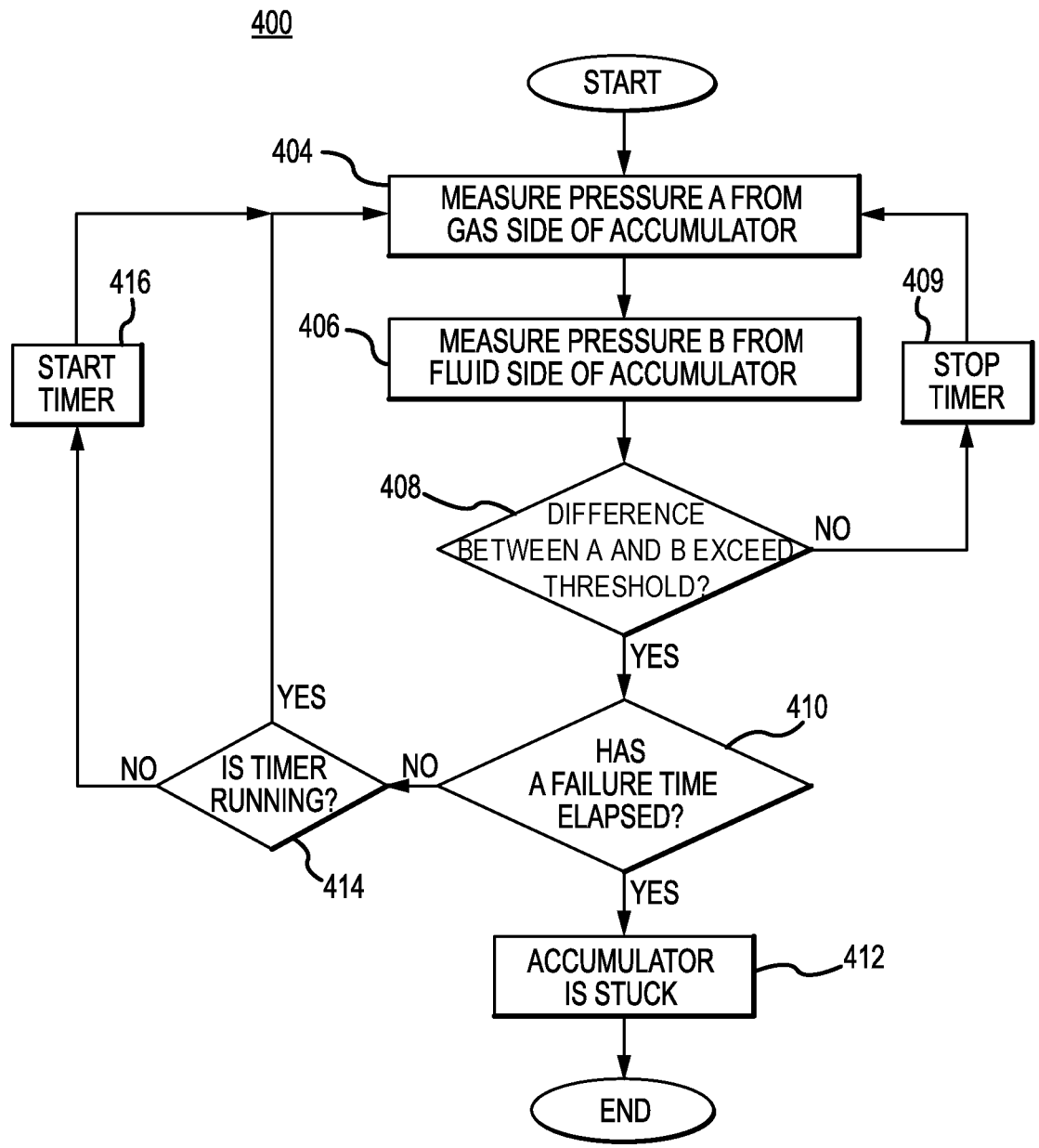
FIG. 4 illustrates a method of detecting a stuck piston in an accumulator, in accordance with various embodiments.

FIG. 4 illustrates a flow chart of the logical operations to implement an exemplary methodology for detecting an accumulator failure and/or sticking accumulator piston, in accordance with various embodiments. The flow chart of FIG. 4 may be thought of as depicting steps of a method 400 carried out by BCU 302 (of FIG. 3) or a separate controller. Although FIG. 4 shows a particular order of executing functional logic blocks, the order of executing the blocks may be changed relative to the order shown.

BCU 302 measures pressure A from a gas side of an accumulator (Step 404). BCU 302 also measures pressure B from a fluid side of the accumulator (Step 406). BCU 302 subtracts pressure A from pressure B and then takes the absolute value of the difference. BCU 302 determines if the difference exceeds a predetermined threshold (Step 408). If the difference between pressure A and pressure B exceeds the predetermined threshold (as described with reference to FIG. 2), then BCU 302 may stop a timer, if running, and continue to monitor pressure A and pressure B (Step 409). If the difference between pressure A and pressure B exceeds the predetermined threshold (as described with reference to FIG. 2), then BCU 302 may continue to check how long the pressure differential has exceeded the predetermined threshold. If the difference between pressure A and pressure B is below the predetermined threshold (as described with reference to FIG. 2), BCU 302 may continue to monitor pressure A and pressure B. BCU 302 may determine whether a failure time has elapsed since the difference between pressure A and pressure B has exceeded the predetermined differential (Step 410).

In various embodiments, if the failure time has not elapsed, BCU 302 may check to see if a timer is running (Step 414). If a timer is running, BCU 302 may continue monitoring pressure A and pressure B to check the difference between the two as shown in steps 404 through 408. If the timer is not running, BCU 302 may start the timer (Step 416). Once the timer has started BCU 302 may continue monitoring pressure A and pressure B to check the difference between the two as shown in steps 404 through 408.

In various embodiments, if the failure time has elapsed, then BCU 302 may determine the accumulator is stuck (Step 412). BCU 302 may respond to the stuck accumulator by signaling accumulator failure in the cockpit, or by signaling ground crews that the part should be replaced. BCU 302 may send a failure signal to a warning light, monitor, or device on the ground. In response to the failure, the failing accumulator may be replaced prior to complete failure. In the event of complete failure, the pilots may take into account the failed hydraulic system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a processor, a first pressure measurement;
   receiving, by the processor, a second pressure measurement;
   determining, by the processor, a difference between the first pressure measurement and the second pressure measurement;
   detecting, by the processor, the accumulator failure based on the difference; and
   signaling, to at least one of a cockpit, a warning light, a monitor, or a maintenance device, that an accumulator is sticking in response to the accumulator failure.

2. The method of claim 1, further comprising measuring a gas-side pressure of the accumulator using a first pressure sensor, wherein the first pressure sensor provides the first pressure measurement.

3. The method of claim 2, further comprising measuring a fluid-side pressure of the accumulator using a second pressure sensor, wherein the second pressure sensor provides the second pressure measurement.

4. The method of claim 1, wherein the detecting the accumulator failure based on the difference further comprises:
   receiving, by the processor, a predetermined threshold; and
   determining, by the processor, the difference exceeds the predetermined threshold.

5. The method of claim 4, wherein the detecting the accumulator failure based on the difference further comprises:
receiving, by the processor, a failure duration; and
determining, by the processor, the difference has exceeded the predetermined threshold for the failure duration.

6. The method of claim 5, wherein the failure duration is greater than or equal to 3 milliseconds.

7. The method of claim 5, wherein the failure duration is less than or equal to 1 second.

8. The method of claim 4, wherein the predetermined threshold is 150 psi.

9. The method of claim 1, further comprising a piston accumulator.

10. The method of claim 9, wherein the accumulator failure is a sticking piston of the piston accumulator.

11. A system comprising:
a processor;
an accumulator having a gas-side and a fluid-side;
a gas-side pressure sensor operatively coupled to the gas-side of the accumulator and the processor; and
a fluid-side pressure sensor operatively coupled to the fluid-side of the accumulator and the processor,
wherein the processor is configured to receive a first pressure measurement from the gas-side pressure sensor,
wherein the processor is configured to receive a second pressure measurement from the fluid-side pressure sensor;
wherein the processor is configured to determine a difference between the first pressure measurement and the second pressure measurement,
wherein the processor is configured to detect an accumulator failure based on the difference,
wherein the processor is configured to signal at least one of a cockpit, a warning light, a monitor, or a maintenance device, that the accumulator is sticking in response to the accumulator failure.

12. The system of claim 11, wherein the processor is configured to receive a predetermined threshold and determine whether the difference exceeds the predetermined threshold.

13. The system of claim 12, wherein the predetermined threshold is 150 psi.

* * * * *